US009105029B2

(12) United States Patent
Nuzzi

(10) Patent No.: US 9,105,029 B2
(45) Date of Patent: Aug. 11, 2015

(54) SEARCH SYSTEM UTILIZING PURCHASE HISTORY

(75) Inventor: Frank Anthony Nuzzi, Pflugerville, TX (US)

(73) Assignee: EBAY INC., San Jose, CA (US)

( * ) Notice: Subject to any disclaimer, the term of this patent is extended or adjusted under 35 U.S.C. 154(b) by 337 days.

(21) Appl. No.: 13/236,029

(22) Filed: Sep. 19, 2011

(65) Prior Publication Data

US 2013/0073543 A1 Mar. 21, 2013

(51) Int. Cl.
*G06F 7/00* (2006.01)
*G06F 17/30* (2006.01)
*G06Q 30/00* (2012.01)

(52) U.S. Cl.
CPC ..................................... *G06Q 30/00* (2013.01)

(58) Field of Classification Search
CPC ..................... G06F 17/30864; G06F 17/30867
USPC .......................................... 707/725; 705/26.8
See application file for complete search history.

(56) References Cited

U.S. PATENT DOCUMENTS

| | | | | |
|---|---|---|---|---|
| 6,785,671 | B1 * | 8/2004 | Bailey et al. | 705/26.81 |
| 8,095,535 | B2 * | 1/2012 | Robson et al. | 707/723 |
| 8,131,702 | B1 * | 3/2012 | Bharat et al. | 707/706 |
| 8,166,026 | B1 * | 4/2012 | Sadler | 707/725 |
| 2003/0200156 | A1 * | 10/2003 | Roseman et al. | 705/27 |
| 2003/0204449 | A1 * | 10/2003 | Kotas et al. | 705/27 |
| 2005/0240575 | A1 * | 10/2005 | Iida | 707/3 |
| 2007/0061333 | A1 * | 3/2007 | Ramer et al. | 707/10 |
| 2008/0005067 | A1 * | 1/2008 | Dumais et al. | 707/3 |
| 2008/0082528 | A1 * | 4/2008 | Bonzi et al. | 707/5 |
| 2008/0109422 | A1 * | 5/2008 | Dedhia | 707/5 |
| 2008/0177793 | A1 * | 7/2008 | Epstein et al. | 707/104.1 |
| 2008/0243617 | A1 * | 10/2008 | Song et al. | 705/14 |
| 2009/0012841 | A1 * | 1/2009 | Saft et al. | 705/10 |
| 2009/0099873 | A1 * | 4/2009 | Kurple | 705/3 |
| 2009/0192888 | A1 * | 7/2009 | Barton et al. | 705/14 |
| 2010/0082454 | A1 * | 4/2010 | Narayanaswami et al. | 705/27 |
| 2010/0262600 | A1 * | 10/2010 | Dumon et al. | 707/725 |
| 2011/0040751 | A1 * | 2/2011 | Chandrasekar et al. | 707/725 |
| 2011/0208822 | A1 * | 8/2011 | Rathod | 709/206 |
| 2011/0225152 | A1 * | 9/2011 | Beaudreau et al. | 707/728 |
| 2011/0231390 | A1 * | 9/2011 | Inagaki et al. | 707/721 |
| 2012/0066208 | A1 * | 3/2012 | Yankovich et al. | 707/723 |
| 2012/0209839 | A1 * | 8/2012 | Andrews et al. | 707/728 |

OTHER PUBLICATIONS

PCT International Search Report, Application No. PCT/US2012/031241 mailed Jun. 28, 2012.

* cited by examiner

*Primary Examiner* — Mark E Hershley
(74) *Attorney, Agent, or Firm* — Haynes and Boone, LLP

(57) ABSTRACT

A method for providing a purchase history context search includes receiving at least one search term from a user through an input device. A purchase history for the user is then accessed from at least one purchase history database over a network. A web index that is located on at least one storage device is then accessed. A plurality of search results, each associated with a web page indexed by the web index, are then determined using the at least one search term and the purchase history, each search result including a link to an associated web page. The plurality of search results are then provided for display on a display device.

20 Claims, 11 Drawing Sheets

SEARCH SYSTEM UTILIZING PURCHASE HISTORY

BACKGROUND

1. Field of the Invention

The present invention generally relates to internet searching and more particularly to a search system that utilizes a user purchase history as context for a search.

2. Related Art

Conventional search systems for searching the Internet typically involve a user providing search terms to the search system and the search system using those search terms to search a web index for web pages to return to the user as search results. The search system may create the web index using "spider" software programs that fetch a first set of web pages, follow a first set of links on the first set of web pages to fetch a second set of web pages that the first set of links point to, follow a second set of links on the second set of web pages to fetch a third set of web pages that the second set of links point to, and so on, in order to index the web such that the web index may include billions of web pages stored on many different devices. In response to receiving search terms from a user, the search system then searches the web index to find the web pages that includes the search terms, and then narrows those web pages into search results using a number of qualifiers such as, for example, a number of times the search terms are included on the web page, whether the search terms are included in the title of the web page, whether the search terms are included in the universal resource locator (URL) for the web page, whether the web page includes synonyms for the search terms, whether the web page is part of what is deemed a 'quality' website, how many web sites link to that web page, and/or a variety of other qualifiers known in the art.

Thus, conventional search systems are limited to using the search terms provided by the user in order to determine the web pages that will be returned as search results.

Thus, there is a need for an improved search system.

SUMMARY

According to one embodiment, a method for providing a purchase history context search includes receiving a search term from a user, accessing a purchase history of the user, and using the search term and purchase history to determine a plurality of search results.

In an embodiment, the purchase history may be accessed from different databases. The method may weigh more recent purchases in the purchase history higher than less recent purchases when determining the search results, and the search results may be ranked using the purchase history. In one example, the search term may be used to determine a superset of search results, and a purchased item in the purchase history may be used to determine a subset of the superset of search results. A plurality of previous searches may be determined for an item that is included in the purchase history, and those previous searches may also be used to determined the search results. In an embodiment, a calendar may be retrieved and used with the search term and the purchase history to determine the search results.

As a result, a user may conduct searches that are tailored, at least in part, to the user's purchase history. This allows a user to provide general search terms and, without any additional action from the user, use those search terms along with purchases that the user has made to determine search results, which provides search results that are relevant to items the user has purchased.

These and other features and advantages of the present disclosure will be more readily apparent from the detailed description of the embodiments set forth below taken in conjunction with the accompanying figures.

Figure 1:
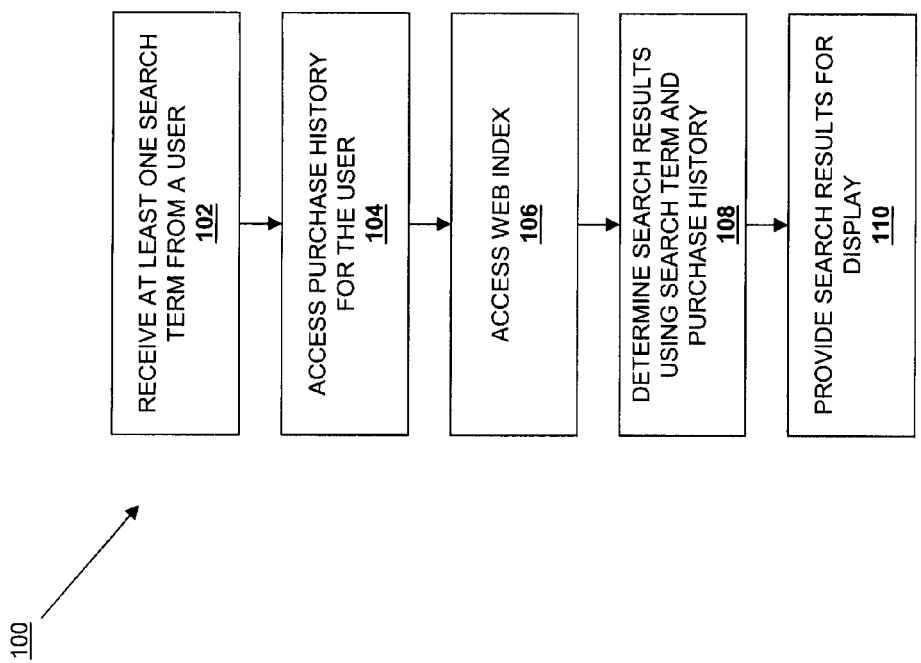
FIG. 1 is a flow chart illustrating an embodiment of a method for providing a purchase history context search.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing a purchase history context search. At least one search term is received from a user, and a purchase history for that user is retrieved. A web index is then accessed and the at least one search term and the purchase history are used to determine a plurality of search results that are then provided for display on a display device of the user. The system and method allow a user to search using general search terms and have search results returned that are determined using the purchase history of the user as context such that at least some of the search results are related to the at least one search term and one or more purchased items in the purchase history.

Figure 2:
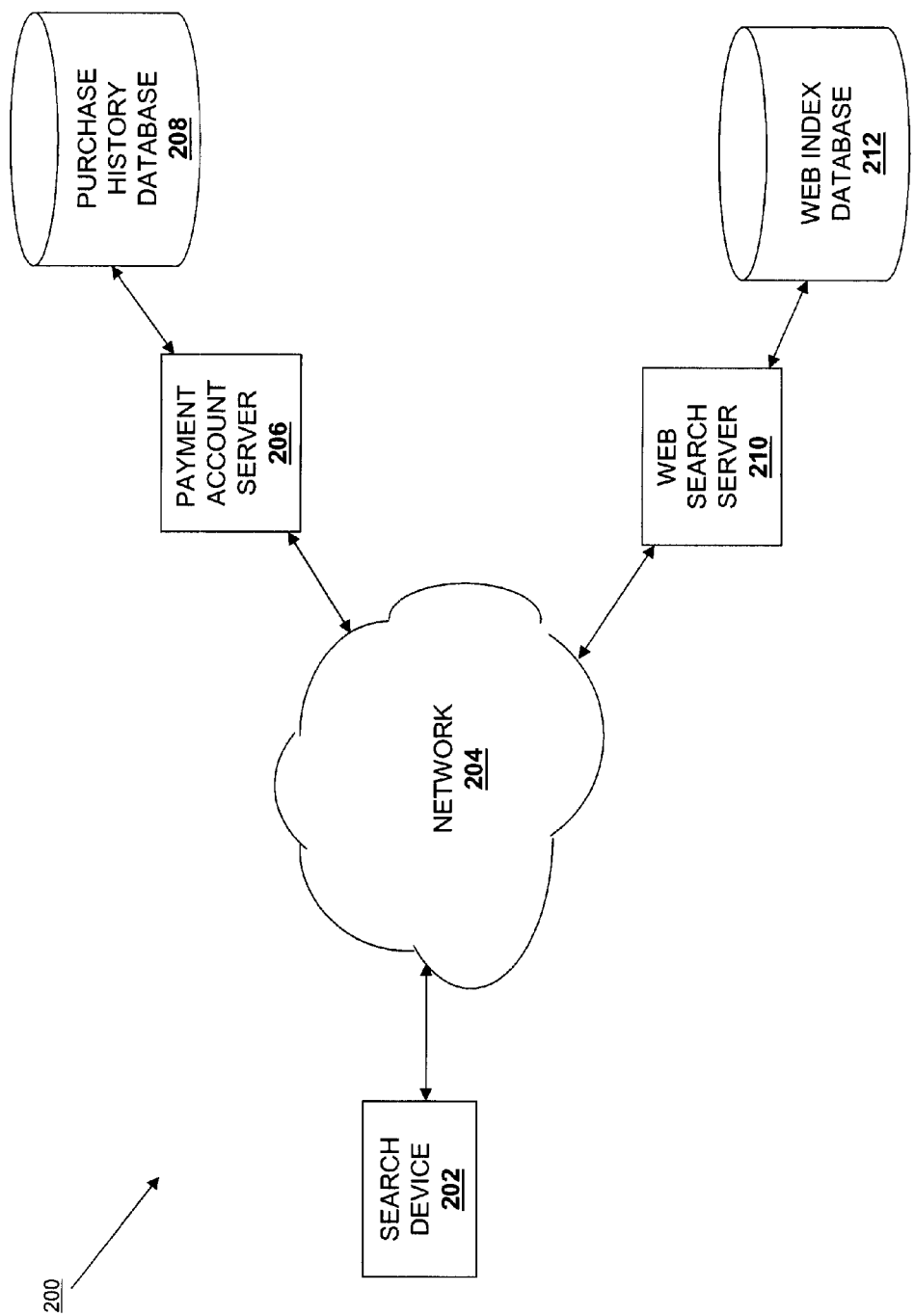
FIG. 2 is a schematic view illustrating an embodiment of a networked search system.
Figure 3:
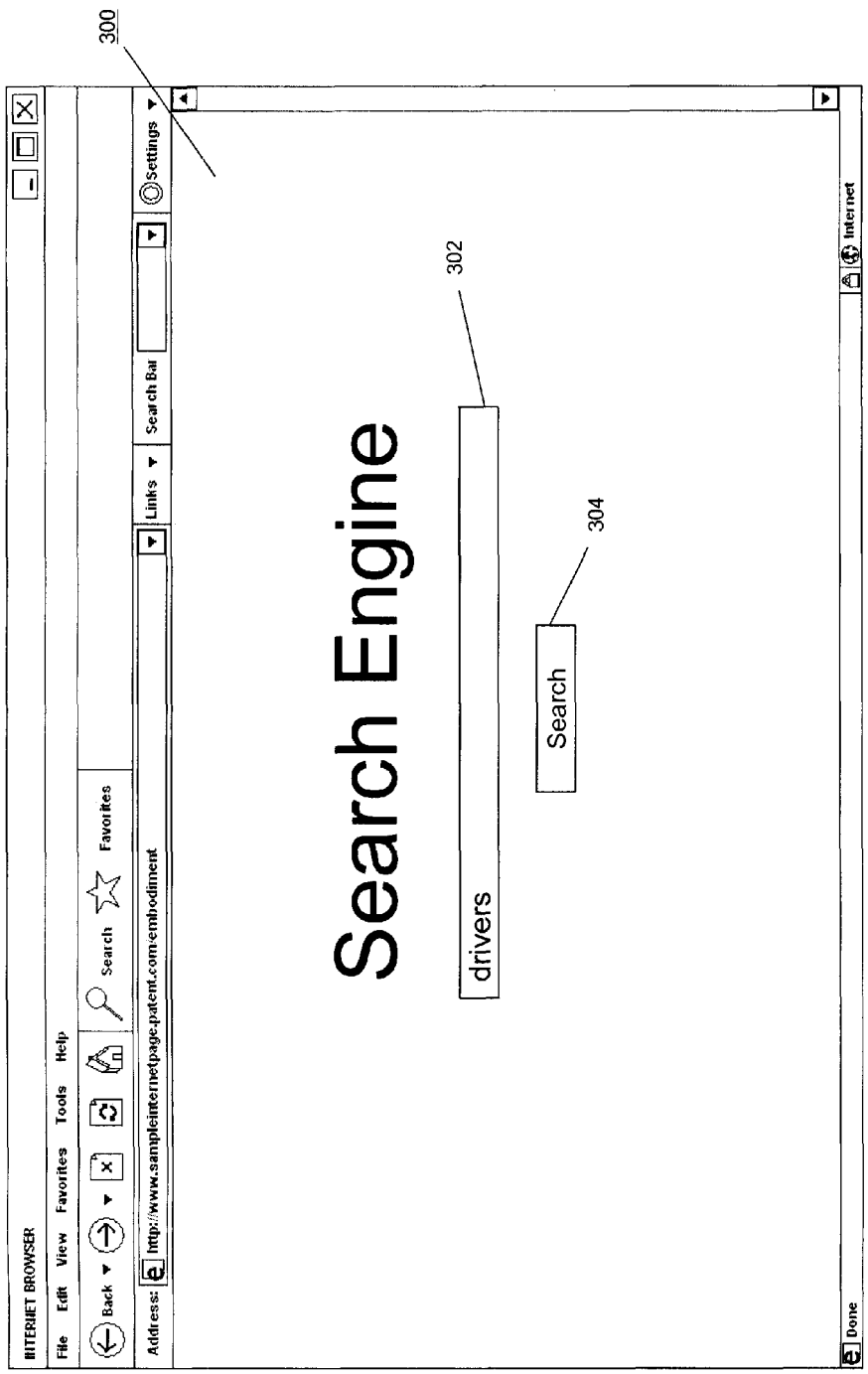
FIG. 3 is a web page illustrating an embodiment of a search page.

Referring now to FIGS. 1, 2, and 3, a method 100 for providing a purchase history context search is illustrated. In the embodiment of the method 100 described below, an account provider may provide a user with a user account, and the user may use the user account to fund payments for purchases made from payees. In another embodiment, a payment service provider such as, for example, PayPal, Inc. of San Jose, Calif. assists in the making of payments from the user to the payee by transferring funds from the user account to a payee account of the payee. However, these embodiments are meant to be merely exemplary, and one of skill in the art will recognize that a variety of modifications may be made to the system discussed below without departing from the scope of the present disclosure.

The method 100 begins at block 102 where at least one search term is received from a user. FIG. 2 illustrates an embodiment of a search system 200 that includes a search device 202 that is coupled to a network 204. At least one payment account server 206 is coupled to both of the network 204 and at least one purchase history database 208. At least one web search server 210 is coupled to both of the network 204 and at least one web index database 212. In an embodiment, the at least one payment account server 206 may be operated by the payment service provider discussed above, the account providers discussed above, and/or a third party payment history provider, and the purchase history database 208 may include one or more databases including purchases of the user of the search device 202. In an embodiment, the at least one web search server 210 may be operated by one or more search providers, and the web index database 212 may include one or more databases including a web index that may include billions of indexed web pages.

FIG. 3 illustrates an embodiment of a search page 300 that may be provided on the search device 202. For example, the web search server 210 may provide the search page 300 through the network 204 to the search device 202 as a web page. The search page 300 includes a search term input 302 and a search submit button 304. Upon being presented with the search page 300 on the search device 202, the user of the search device 202 may use an input device (e.g., a mouse, a keyboard, and/or other input devices known in the art) connected to the search device 202 to provide at least one search term (e.g., "drivers" in the illustrated embodiment) in the search term input 302. Upon selecting the search submit button 304, the search device 202 sends the at least one search term provided in the search term input 302 over the network 204, and the at least one search term is received by the at least one web search server 210.

In an embodiment, the at least one search term received by the at least one web search server 210 is associated with a user identifier of the user that provided the at least one search term using the search device 202. For example, a cookie or other identifier on the search device 202 may be provided along with the at least one search term to the at least one web search server 210, and that cookie may include the user identifier that identifies or otherwise indicates that the user of the search device 202 provided the at least one search term. In another embodiment, the user of the search device 202 may have an account that is associated with the search page 300, and an account identifier that identifies the user of the search device 202 is sent along with the at least one search term to the at least one web search server 210. While a few examples of user identifiers that identify the user that sent the at least one search term to the at least one web search server 210 have been described, one of skill in the art will recognize that a variety of other user identifiers for identifying the user of the search device 202 may be used with the method 100 without departing from the scope of the present disclosure.

Figure 4:
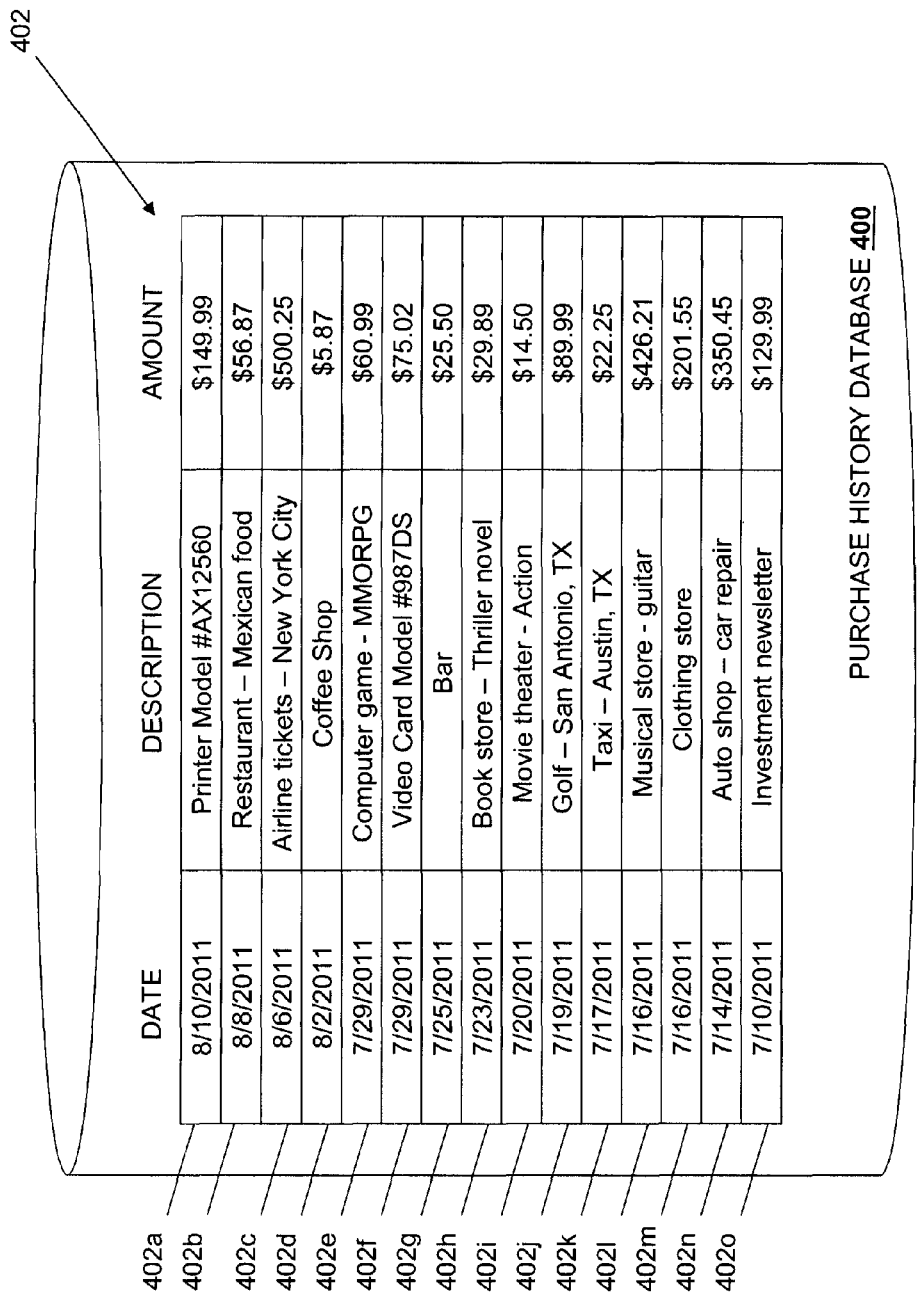
FIG. 4 is a schematic view illustrating an embodiment of a purchase history database.

Referring now to FIGS. 1, 2, and 4, the method 100 then proceeds to block 104 where a purchase history of the user is retrieved. In an embodiment, the user of the search device 202 may have previously authorized the at least one web search server 210 to access one or more payment histories associated with one or more payment accounts of the user. For example, the user of the search device 202 may have provided user authentication information for one or more payment accounts of the user. In another example, the user of the search device 202 may have provided user authentication information for a payment history aggregator of the payment accounts of the user. In another example, the web search server 210 may be operated by a payment service provider, an account provider, and/or another entity that has access to one or more payments accounts of the user. In another embodiment, the user may have provided authorization for the at least one web search server 210 to access one or more payment histories associated with one or more payments accounts of the user along with the provision of the at least one search term in block 102 of the method 100. While a few examples have been provided, one of skill in the art will recognize that the web search server 210 may be provided authorization to access one or more payments histories of a user in a variety of manners without departing from the scope of the present disclosure.

FIG. 4 is an illustration of an embodiment of a purchase history database 400 that may be the purchase history database 208 described above with reference to FIG. 2. In an embodiment, the purchase history database 400 includes a purchase history 402 of the user that includes plurality of purchased items 402a, 402b, 402c, 402d, 402e, 402f, 402g, 402h, 402i, 402j, 402k, 402l, 402m, 402n, and 402o each including purchase information such as, for example, a purchase date, a purchase description, and a purchase amount. While the purchase history 402 is illustrated as a single purchase history located in a single purchase history database 400, the purchase history 402 may be located in several different databases that are accessible over the network 204 through a plurality of different devices (e.g., multiple payment history databases accessible through respective payment account servers). The payment history 402 may be retrieved from the different databases at block 104 of the method 100 or may be aggregated into a single database prior to being accessed at block 104.

At block 104, the web search server 210 accesses the at least one payment account server 206 through the network 204 and, in an embodiment, may provide user authentication(s) to the payment account server(s) 206 in order to access the payment history 402 of the user that provided the at least one search term in block 102 of the method 100. Thus, upon providing proper user authentication, the at least one web server 210 accesses the payment history 402 of the user in the purchase history database 400 over the network 204.

Referring now to FIGS. 1, 2, 3, and 4, the method 100 then proceeds to block 106 and 108 where a web index is accessed and the at least one search term and the purchase history are used to determine a plurality of search results. Using the at least one search term received in block 102 of the method 100 and the purchase history accessed in block 104 of the method 100, the web search server 210 accesses a web index that is located in the at least one web index database 212 in order to determine a plurality of search results. In an embodiment, the web index in the at least one web index database 212 includes a plurality of web pages, an index of the plurality of web pages, information included in the plurality of web pages, links to the plurality of web pages, metadata included with the plurality of web pages, and/or a plurality of other web index information known in the art.

In an embodiment, the web search server 210 may use the at least one search term to determine a superset of search results that include web pages that are related to the at least one search term. Each of the web pages in the superset of search results may be related to the at least one search term due to a number of times the at least one search term is included on a web page, whether the at least one search term is included in the title of a web page, whether the at least one search term is included in the universal resource locator (URL) of a web page, whether a web page includes synonyms for the at least one search term, whether a web page is part of what is deemed a 'quality' website, how many web sites link to that web page, and/or a variety of other search term/search results relationships known in the art. The superset of search results may then be "filtered" using the purchased items in the purchase history to provide a subset of the superset of search results that include web pages that are related to one or more purchase items in the purchase history. In another embodiment, the at least one search result and the purchase items in the purchase history may be used together to determine the plurality of search results (i.e., rather than first determining a set of results using the at least one search term and then filtering those results using the purchase items in the purchase history).

In another embodiment, more recent purchased items in the purchases history may be provided more weight in determining the plurality of search results relative to less recent purchased items. For example, using the purchase history illustrated in FIG. 4, the web search server 210 may give more weight to the purchased items 402a, 402b, 402c, and 402d in determining the plurality of search results relative to the remaining purchased items because the purchased items 402a, 402b, 402c, and 402d were purchased more recently. In an embodiment, the web search server 210 may provide more weight to purchases made within a month, a week, a number of days, etc. The time period within which a purchase item is provided more weight may be configurable by the user using the search device 202. Furthermore, different weights may be provided such that, for example, purchases made within 3 days of a search are provided the highest weight, purchases made between 3 days and a week from the search are provided an intermediate weight, purchases made between 1 week and 2 weeks from the search are provided a lowest weight, and purchases older than 2 weeks from the search are provided little or no weight. While a specific weighting system has been described, one of skill in the art will recognize that a variety of weighting systems will fall within the scope of the present disclosure.

In another embodiment, the web search server 210 may be coupled to a search database (not illustrated) that includes a plurality of previous searches by users. In this embodiment, at block 108 of the method 100, the web search server 210 may access the search database and use a purchased item in the purchase history 402 to determine a plurality of previous searches that were associated with that purchased item (e.g., searches related to that purchased item that were conducted by users other than the user of the search device 202 that provided the at least one search term at block 102 of the method 100). The web search server 210 may then determine whether the plurality of previous searches associated with the purchased item are relevant to the at least one search term provided in block 102 of the method 100 in order to determine the plurality of search results. For example, using the purchase history illustrated in FIG. 4, the web search server 210 may use the purchase item 402a (a purchase for "Printer Model #AX12560") to determine that a plurality of previous searches related to the purchase item 402a include searches for software drivers, ink, and particular problems associated with the printer. Then, using the example of the at least one search term of "drivers" illustrated in FIG. 3, the web search server 210 may determine that the search results for the previous searches for software drivers are relevant to the at least one search term and should be included in the search results. In another example, using the purchase history illustrated in FIG. 4, the web search server 210 may use the purchase item 402b (a purchase for "Restaurant—Mexican food") to determine that a plurality of previous searches related to the purchase item 402b includes searches for recipes, heartburn medication, and directions to the restaurant. For example, if the purchase item 402b was purchased within a few hours (e.g., less than 3 hours) of the provision of the at least one search term and the at least one search term provided in block 102 of the method 100 includes the term "sick", the web search server 210 may determine that the search results for the previous searches for heartburn medication are relevant to the at least one search term and should be included in the search results.

Referring now to FIGS. 1, 2, 4, 5, and 6, the method 100 then proceeds to block 110 where a plurality of search results are provided for display. In an embodiment, the web search server 210 provides the plurality of search results determined in block 108 of the method 100 over the network 204 to the search device 202 for display device on a display of the search device 202.

Figure 5:
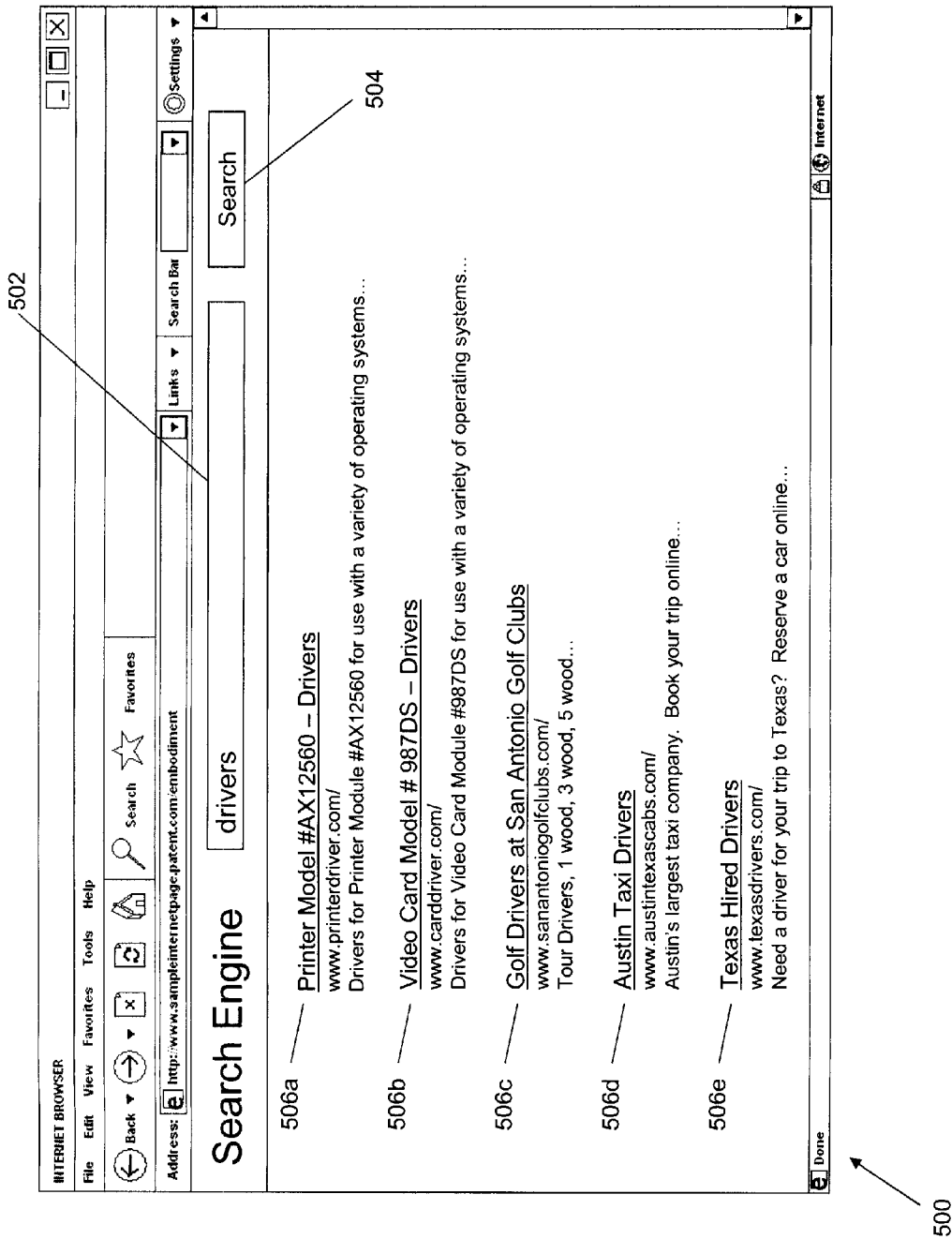
FIG. 5 is a web page illustrating an embodiment of a search results page.

FIG. 5 is an illustration of an embodiment of a search results page 500. The search results page 500 includes a search term input 502, a search submit button 504, and a plurality of the search results 506a, 506b, 506c, 506d, and 506e determined at block 108 of the method 100. FIG. 5 provides a specific embodiment where the purchase history 402 illustrated in FIG. 4 has been used to determine a plurality of search results. For example, at block 102, the web search server 210 received the at least one search term "drivers" from the user of the search device 202 (illustrated in FIG. 2), and then accessed the purchase history 402 of the user (illustrated in FIG. 4) and the web index to determine the search results 506a, 506b, 506c, 506d, and 506e. Using the at least one search term "drivers", the web search server 210 may review the accessed purchase history 402 and determine which of the purchase items are relevant to the at least one search term "drivers".

For example, the web search server 210 may determine that the purchase item 402a is relevant (due to the description "Printer Model #AX12560" being related to software drivers), the purchase item 402f is relevant (due to the description "Video Card Model #987DS" being related to software drivers), the purchase item 402j is relevant (due to the description "Golf—San Antonio, Tex." being related to driver golf clubs), the purchase item 402k is relevant (due to the description "Taxi—Austin, Tex." being related to taxi drivers), and the purchase item 402n is relevant (due to the description "Auto shop—car repair" being related to hired drivers). The web search server 210 may then use the web index in the web index database 212 to determine the search results 506a, 506b, 506c, 506d, and 506e that are each associated with a web page that was indexed by the web index and that each include a link to an associated web page. The web server 210 then provides those search results 506a, 506b, 506c, 506d, and 506e on the search results page 500 for display on the search device 202, as illustrated in FIG. 5. As can be seen, the search result 506a provides a link to a webpage for software drivers for the Printer Model #AX12560, the search result 506b provides a link to a webpage for software drivers for the Video Card Model #987DS, the search result 506c provides a link to a webpage for golf club drivers, the search result 506d provides a link to a webpage for Austin taxi drivers, and the search result 506e provides a link to a webpage for hired drivers. One of skill in the art will recognize from the description above that the search results 506a, 506b, 506c, 506d, and 506e are particularly relevant to the purchase history 402 of the user that was accessed in block 104 of the method 100.

In another example, the at least one search term may include "return", and the web search server 210 may access the payment history 402 and determine that the purchase item 402a is relevant (due to the description "Printer Model #AX12560"), the purchase item 402c is relevant (due to the description "Airline tickets—New York City"), the purchase item 402d is relevant (due to the description "Computer game—MMORPG"), and the purchase item 402e is relevant (due to the description "Book store—Thriller Novel"). The web search server 210 may then determine search results that include links to web pages that include the return policies for the merchants from whom these purchase items were purchased. While a few examples of search results have been described, one of skill in the art will recognize that the purchase history of a user may be used in combination with search terms in a variety of other ways than those described to produce search results that are relevant to purchases of the user without departing from the scope of the present disclosure.

In an embodiment, the search results that are provided for display (e.g., as illustrated in FIG. 5) may be ranked using the purchase history. For example, the search results 506a, 506b, 506c, 506d, and 506e may have been ranked according to the weights provided to more recent purchased items as described above. Thus, the search result 506a may be provided 'first' (e.g., at the top of the search results page 500) relative to the search result 506b because the purchased item 402a that the search result 506a is based upon was purchased more recently than the purchased item 402f that the search result 506b is based upon. Furthermore, the search results 506c, 506d, and 506e may be displayed with their relative positioning because of the purchase dates of their related purchase items, illustrated in FIG. 4.

In another embodiment, additional user-specific information may be used along with the at least one search term and the purchase history in order to determine the plurality of search results. For example, the user may provide the web search server 210 access to a user calendar that may be stored locally on the search device 202, remotely on a database that is accessible over the network 204, and/or in a variety of other locations known in the art. In response to receiving the at least one search term at block 102 of the method 100, the web search server 210 may access the user calendar as well as the purchase history 402 of the user at block 104 of the method 100. The web search server 210 may then use calendar items in the user calendar along with purchase items in the purchase history and the at least one search term in order to determine the plurality of search results at block 108 of the method 100. For example, using the at least one search term "drivers" (illustrated in FIG. 3), the purchase item 402c including the "Airline tickets—New York City", and a calendar item that indicates that the user is traveling to New York City the coming weekend, the web search server 210 may determine that a web page that includes information about hired drivers in New York City should be provided to the user for display as one of the plurality of search results.

In another embodiment, the use of user-specific information such as a calendar may include the web search server 210 accessing a user calendar that indicates that the user went on vacation during a particular time period in the past year (or multiple years). The web search server 210 may then access the purchase history of the user to determine how much the user spent during that vacation on a hotel, plane tickets, entertainment, and/or a variety of other vacation related payments known in the art. Then, for example, in response to at least one search term that includes "vacation", the web search server may then search the web index in the web index database 212 to determine a plurality of search results for vacations that include similar destinations to those that were included in the user calendar and/or the purchase history, along with hotel deals, plane tickets, entertainment, and/or other vacation purchases that are in the same or similar price ranges as those purchased by the user in prior vacations.

While a specific example of a vacation has been described, one of skill in the art will recognize how other elements of a user calendar and/or other user-specific information may be used to provide context for a search without departing from the scope of the present disclosure. For example, if the user is using a mobile user device that includes a location determination component (e.g., a Global Positioning System (GPS), a cell tower triangulation system, and/or a variety of other location determination systems known in the art), the current location of the user may be retrieved and used with the purchase history to further refine the search. For example, a search for "restaurants" may reference the current location of the user along with restaurant payment items in the purchase history and return restaurants that are in the current location of the user and that are the same or similar (e.g., "Mexican restaurants") to restaurant payment items in the purchase history.

Thus, a system and method for providing a purchase history context search has been described that includes a user providing a web search provider access to the purchase history of the user. In some embodiments, the user may provide the web search provider with access to other user-specific information (e.g., a calendar). The web search provider may then access the purchase history and/or other user specific information in response to receiving at least one search term in order to provide context for the search. Such context allows the web search provider to provide for display a plurality of search results that are relevant to purchases or other user-specific events without the need for the user to do anything other than provide access to that information.

Figure 6:
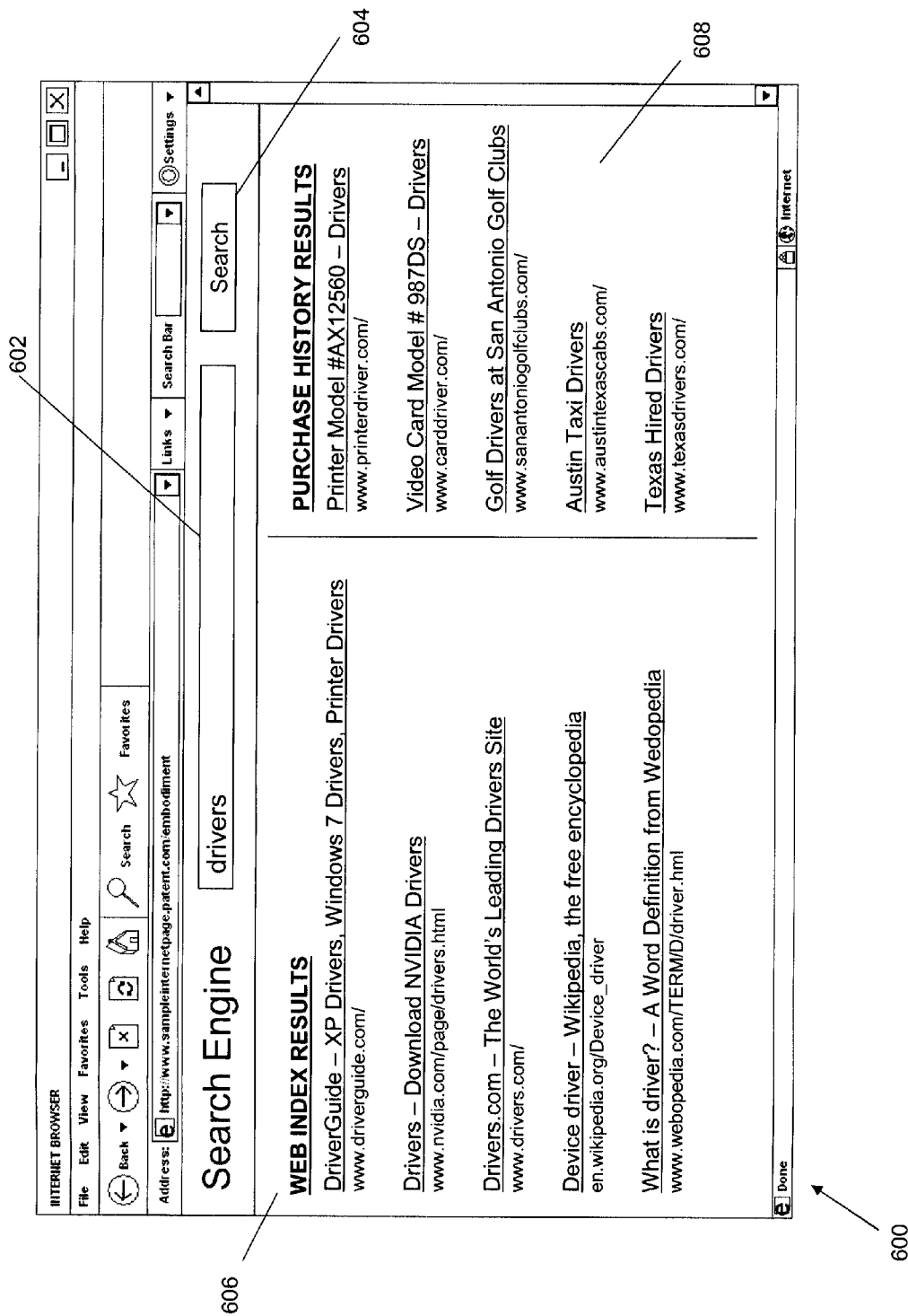
FIG. 6 is a web page illustrating an embodiment of a search results page

Referring now to FIG. 6, an embodiment of a search results page 600 is illustrated that may replace the search results page 500 described above with reference to FIG. 5. The search results page 600 includes a search term input 602, a search submit button 604, a standard search results section 606 that is determined using conventional methods know in the art, and a purchase history search results section 608 including a plurality of search results determined according to the method 100 as described above. Thus, the web search server 210 is operable to provide search results using standard methods as well as using the purchase history of the user (and/or other user-specific information), and those search results may be displayed separately such that a user may direct their attention to the standard search results section 606 when the at least one search term provided in block 102 of the method 100 is not related to a purchase, while directing attention to the purchase history search results section 608 when the at least one search term is related to a purchase.

Figure 7:
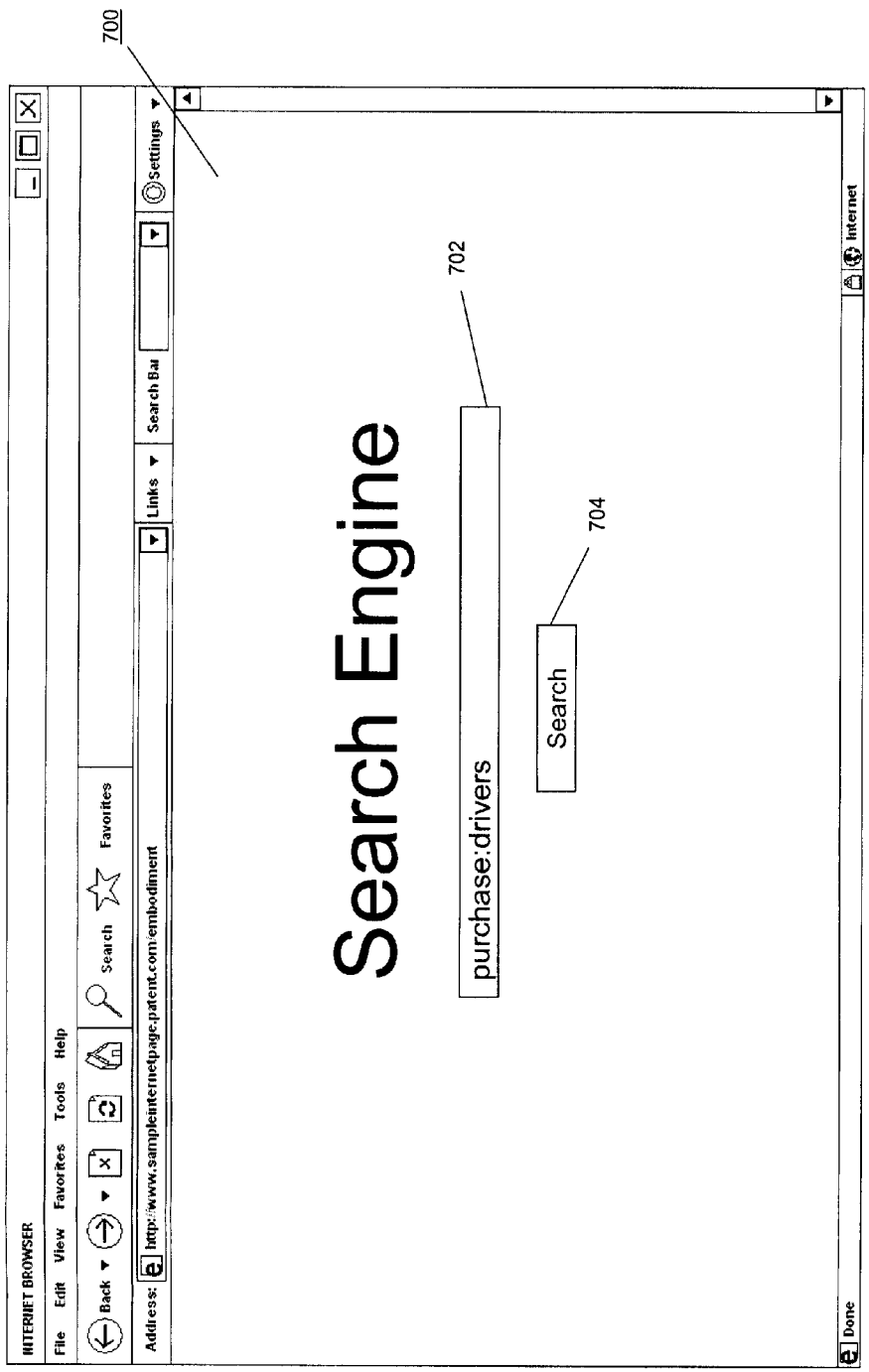
FIG. 7 is a web page illustrating an embodiment of a search page

Referring now to FIG. 7, an embodiment of a search page 700 is illustrated that may replace the search page 300, illustrated above with reference to FIG. 3. The search page 700 includes a search term input 702 and a search submit button 704. Upon being presented with the search page 700 on the search device 202, the user of the search device 202 may use an input device (e.g., a mouse, a keyboard, and/or a variety of other input devices known in the art) connected to the search device 202 to provide at least one search term (e.g., "drivers" in the illustrated embodiment) that is modified by a search term specifier (e.g., "purchase:" in the illustrated embodiment) in the search term input 302. The search term specifier may be used to indicate to the web search server 210 that the purchase history of the user should be used as context for the search conducted using the at least one search term "drivers". Upon selecting the search submit button 704, the search device 202 sends the at least one search term and the search term specifier provided in the search term input 702 over the network 204, and the at least one search term is received by the at least one web search server 210. The web search server 210 may then operate substantially as described above according to the method 100.

Figure 8:
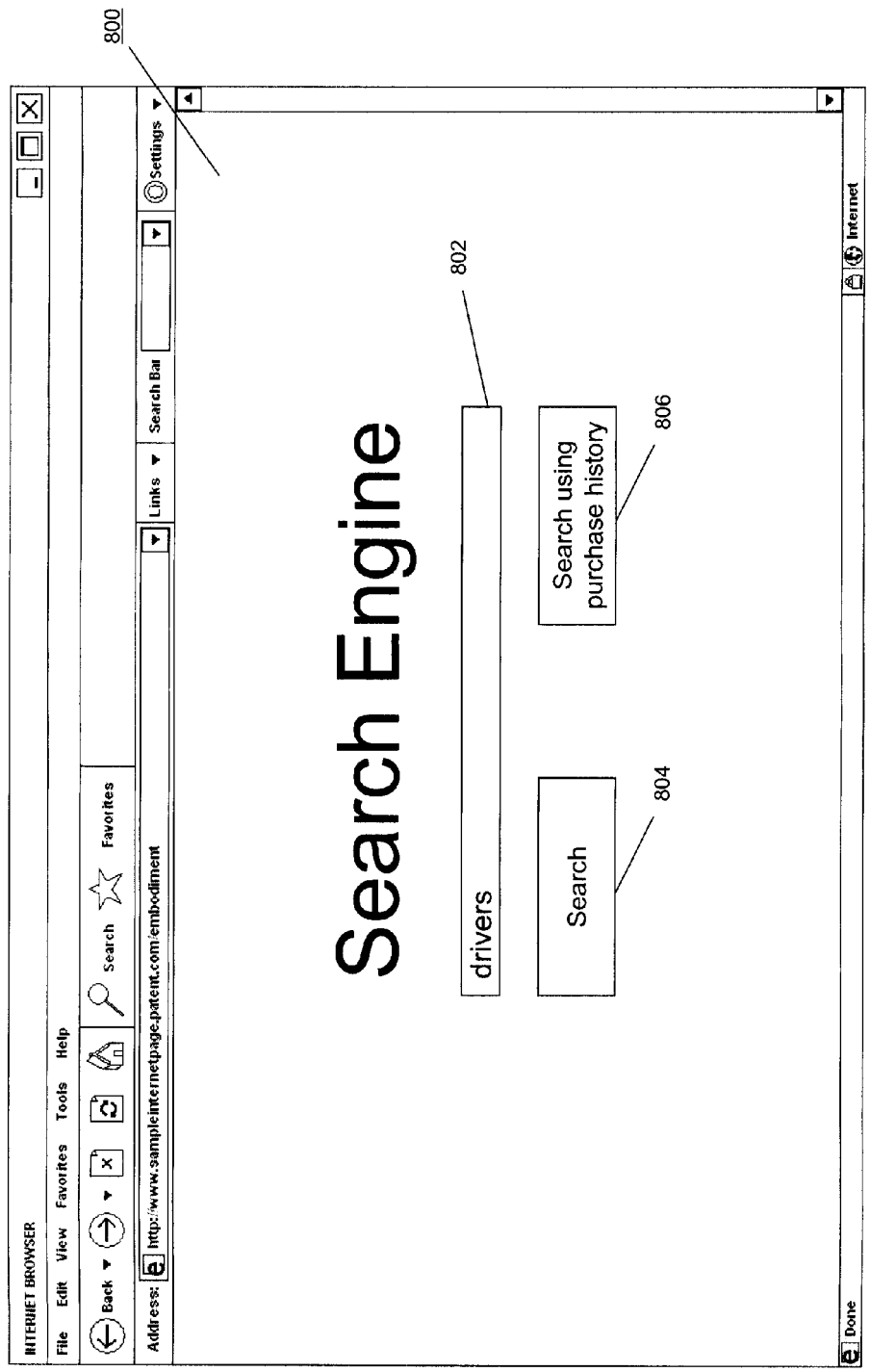
FIG. 8 is a web page illustrating an embodiment of a search page

Referring now to FIG. 8, an embodiment of a search page 800 is illustrated that may replace the search page 300, illustrated above with reference to FIG. 3. The search page 800 includes a search term input 802, a standard search submit button 804, and a search using purchase history button 806. Upon being presented with the search page 800 on the search device 202, the user of the search device 202 may use an input device connected to the search device 202 to provide at least one search term (e.g., "drivers" in the illustrated embodiment) in the search term input 302. Upon selecting the standard search submit button 704, the search device 202 will send the at least one search term over the network 204 to be used by the at least one web search server 210 to conduct a conventional web search using the at least one search term as is known the art. Upon selecting the search using purchase history button 806, the search device 202 will send the at least one search term over the network 204 to be used by the at least one web search server 210 along with the purchase history of the user, to conduct a purchase history context web, as described above with reference to the method 100.

Figure 9:
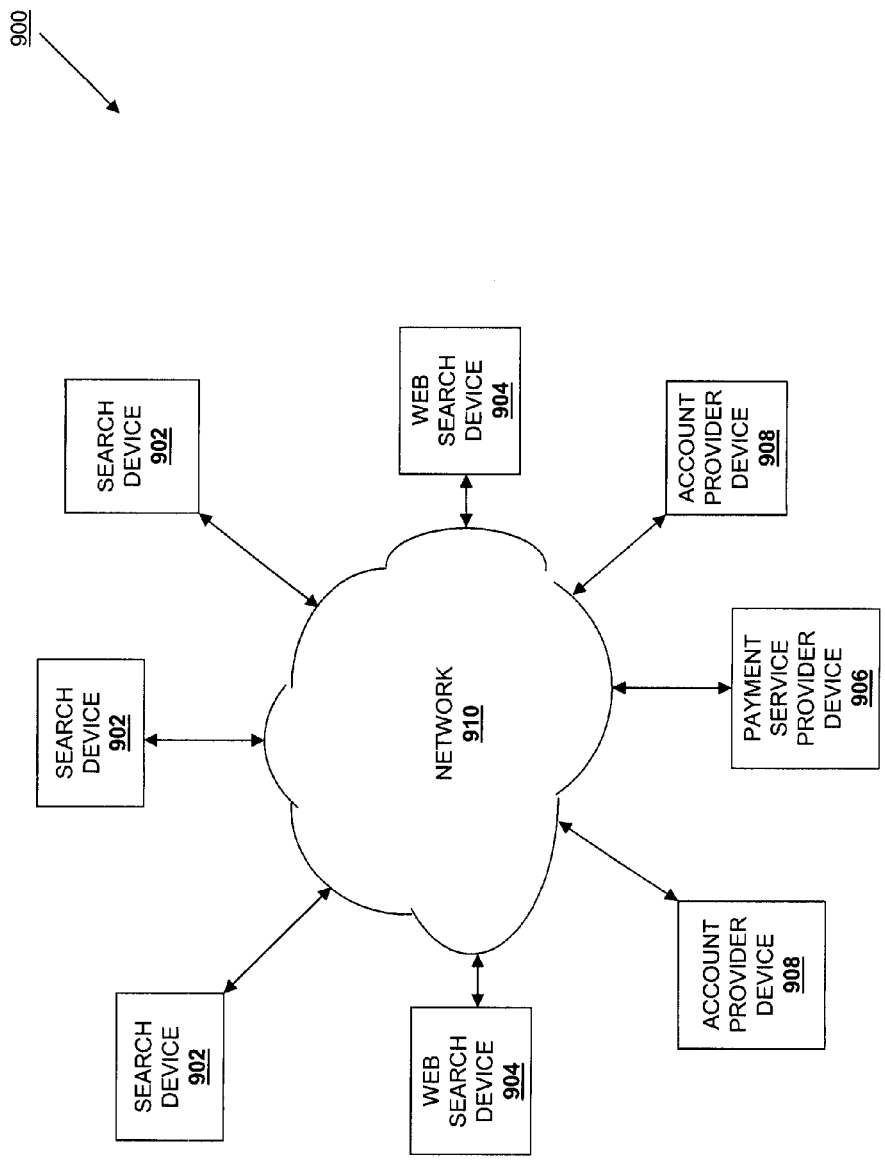
FIG. 9 is a schematic view illustrating an embodiment of a networked system.

Referring now to FIG. 9, an embodiment of a networked system 900 used in the search system described above is illustrated. The networked system 900 includes a plurality of search devices 902, a plurality of web search devices 904, a payment service provider device 906, and a plurality of account holder devices 908 in communication over a network 910. Any of the search devices 902 may be the search device 202, discussed above. The web search devices 904 may be the web search server 204 discussed above and may be operated by the web search providers discussed above. The payment service provider device 906 may be the payment service provider devices discussed above and may be operated by a payment service provider such as, for example, PayPal Inc. of San Jose, Calif. The account provider devices 908 may be the account provider devices discussed above and may be operated by the account providers discussed above such as, for example, credit card account providers, bank account providers, savings account providers, and a variety of other account providers known in the art.

The search devices 902, web search devices 904, payment service provider device 906, and account provider devices 908 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 910.

The network 910 may be implemented as a single network or a combination of multiple networks. For example, in various embodiments, the network 910 may include the Internet and/or one or more intranets, landline networks, wireless networks, and/or other appropriate types of networks.

The search devices 902 may be implemented using any appropriate combination of hardware and/or software configured for wired and/or wireless communication over network 910. For example, in one embodiment, the search devices 902 may be implemented as a personal computer of a user in communication with the Internet. In other embodiments, the search devices 902 may be a smart phone, personal digital assistant (PDA), laptop computer, and/or other types of computing devices.

The search devices 902 may include one or more browser applications which may be used, for example, to provide a convenient interface to permit the user to browse information available over the network 910. For example, in one embodiment, the browser application may be implemented as a web browser configured to view information available over the Internet.

The search devices 902 may also include one or more toolbar applications which may be used, for example, to provide user-side processing for performing desired tasks in response to operations selected by the user. In one embodiment, the toolbar application may display a user interface in connection with the browser application.

The search devices 902 may further include other applications as may be desired in particular embodiments to provide desired features to the search devices 902. In particular, the other applications may include a payment application for payments assisted by a payment service provider through the payment service provider device 906. The other applications may also include security applications for implementing user-side security features, programmatic user applications for interfacing with appropriate application programming interfaces (APIs) over the network 910, or other types of applications. Email and/or text applications may also be included, which allow the user to send and receive emails and/or text messages through the network 910. The search devices 902 include one or more user and/or device identifiers which may be implemented, for example, as operating system registry entries, cookies associated with the browser application, identifiers associated with hardware of the search device 902, or other appropriate identifiers, such as a phone number. In one embodiment, the user identifier may be used by the payment service provider device 906 and/or account provider device 908 to associate the user with a particular account as further described herein.

Figure 10:
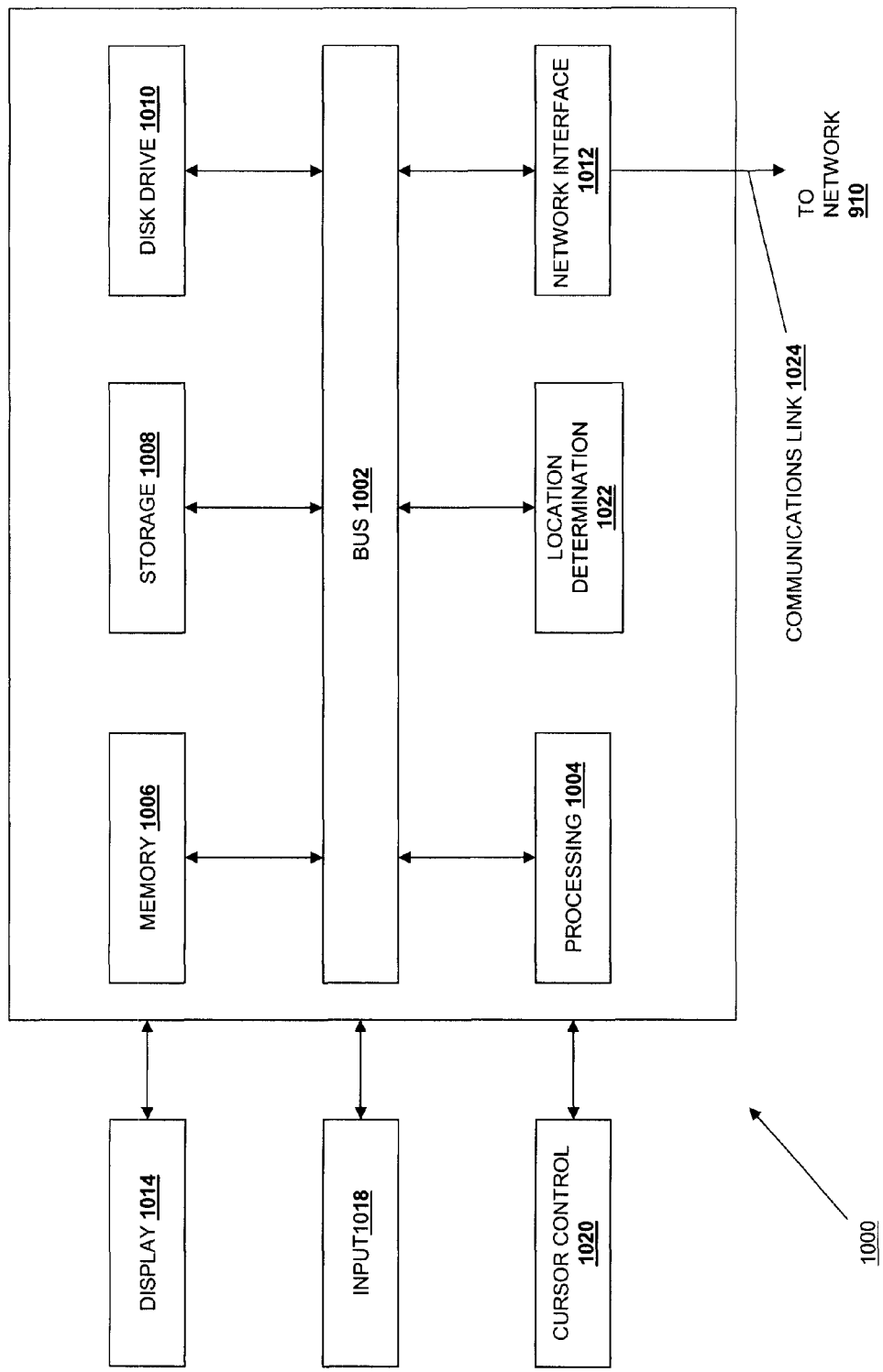
FIG. 10 is a schematic view illustrating an embodiment of a computer system.

Referring now to FIG. 10, an embodiment of a computer system 1000 suitable for implementing, for example, the search devices 202 and/or 902, the web search server/device 210 and/or 904, the payment service provider device 906, and/or the account provider device 908, is illustrated. It should be appreciated that other devices utilized by users, web search providers, payment service providers, and account providers in the search system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device, a cell tower triangulation device, and/or a variety of other location determination devices known in the art.) In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the search devices 202 and 902, the web search servers/devices 210 and 904, the payment service provider device 906, and/or the account provider device(s) 908. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 910 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
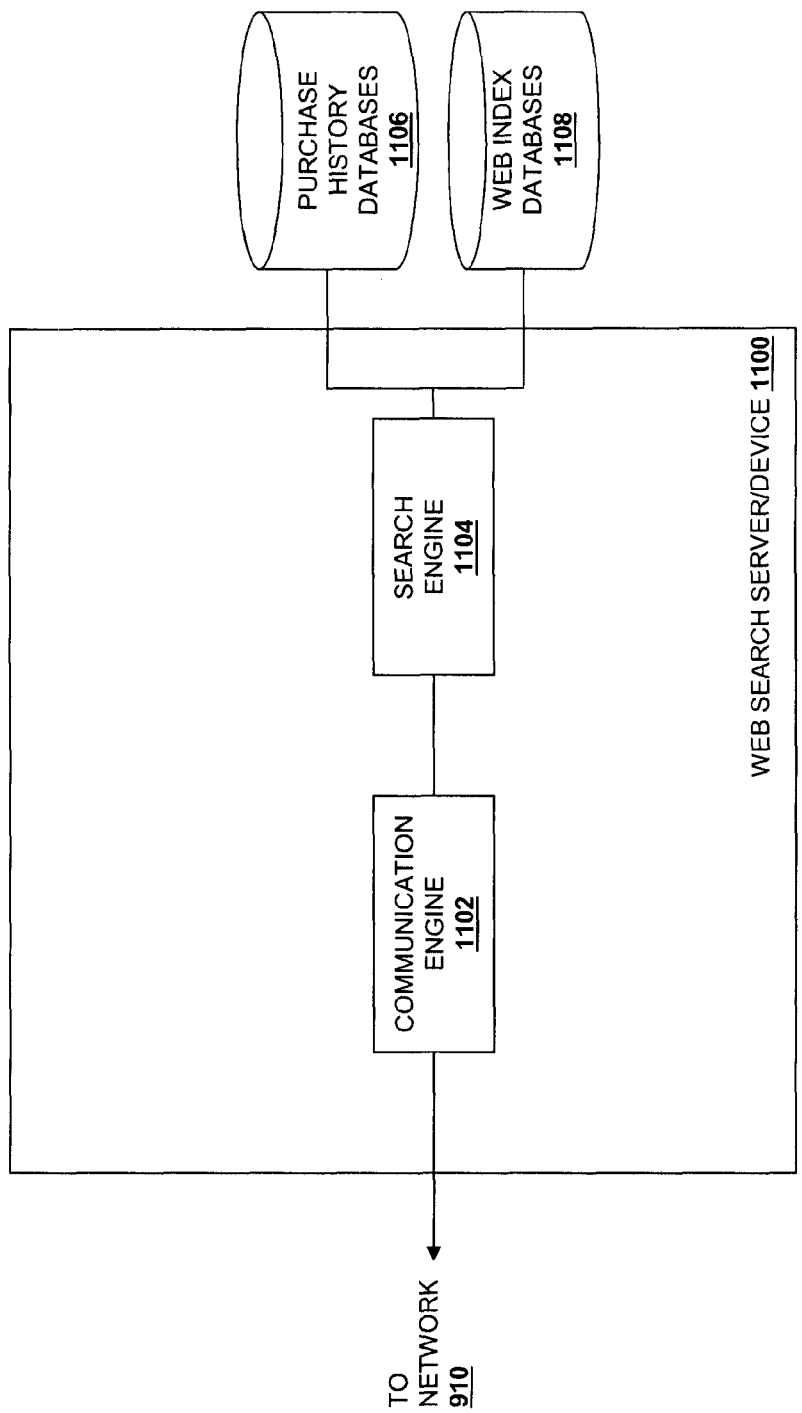
FIG. 11 is a schematic view illustrating an embodiment of a web search server/device.

Referring now to FIGS. 11, an embodiment of a web search server/device 1100 is illustrated. In an embodiment, the device 1100 may be the web search server/devices 210 and/or 904. The device 1100 includes a communication engine 1102 that is coupled to the network 910 and to search engine 1104 that is coupled to each of a plurality of purchase history databases 1106 and a plurality of web index databases 1108. The communication engine 1102 may be software or instructions stored on a computer-readable medium that allows the device 1100 to send and receive information over the network 910. The search engine 1104 may be software or instructions stored on a computer-readable medium that is operable to receive and/or access user access information to user payment histories, receive the at least one search term, access the user payment histories and/or other user specific information, determine a plurality of search results using the at least one search term, the user purchase histories, and/or the user specific information, and provide the plurality of search results for display by a search device of a user.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payment histories; however, a user may include histories with other entities that do not technically include payments, such as gifts or donations to charities and individuals. Thus items in a payment history do not have to involve a purchase, but may be a loan, a charitable contribution, a gift, etc. Thus, purchase items as used herein can also include gifts to charities, individuals, and any other entity or person receiving funds from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for providing a purchase history context search, comprising:

receiving at least one search term from a user through an input device;

accessing a purchase history for the user from at least one purchase history database over a network;

accessing a web index that is located on at least one storage device;

determining a plurality of web pages that are indexed by the web index and related to the at least one search term;

accessing a calendar of the user from at least one calendar database;

using a plurality of purchases in the purchase history to determine a plurality of purchase history search results that include at least some of the plurality of web pages that are each related to at least one of the plurality of purchases, wherein each of the plurality of purchase history search results includes a link to one of the plurality of web pages that is related to the at least one of the plurality of purchases, and wherein the determining the plurality of purchase history search results includes using the at least one search term, the purchase history, and a location included in the calendar; and providing the plurality of purchase history search results for display on a display device, wherein links to web pages that are related to more recent purchases in the plurality of purchases are provided a prioritized display position relative to links to web pages that are related to less recent purchases in the plurality of purchases.

2. The method of claim 1, wherein more recent purchases in the plurality of purchases are provided more weight in the determining the plurality of purchase history search results relative to less recent purchases in the plurality of purchases.

3. The method of claim 1, wherein the purchase history is accessed over the network from a plurality of different purchase history databases through a plurality of different devices.

4. The method of claim 1, further comprising:
providing a plurality of search term search results for display on the display device adjacent the plurality of purchase history search results, wherein the plurality of search term search results include the plurality of web pages that are indexed by the web index and related to the at least one search term.

5. The method of claim 1, wherein the purchase history includes a first purchase and the determining the plurality of purchase history search results further comprises:
determining a superset of search term search results, each associated with a web page indexed by the web index, using the at least one search term; and
determining the plurality of purchase history search results using the first purchase, wherein the plurality of purchase history search results comprise a subset of the superset of search term search results that are related to the first purchase.

6. The method of claim 1, wherein the purchase history includes a first purchase associated with an item, and the determining the plurality of purchase history search results further comprises:
accessing a search database over the network;
determining a plurality of previous searches associated with the item;
determining the plurality of purchase history search results through the association of the item with the plurality of previous searches.

7. The method of claim 1,
wherein the location included in the calendar is associated in the calendar with a time period that is prior to a current time period.

8. A non-transitory machine-readable medium comprising a plurality of machine-readable instructions which, when executed by one or more processors, are adapted to cause the one or more processors to perform a method comprising:
receiving at least one search term from a user through an input device;
accessing a purchase history for the user from at least one purchase history database over a network, wherein the purchase history includes a plurality of purchases that are each associated with at least one item;
accessing a web index that is located on at least one storage device;
accessing a calendar of the user from at least one calendar database;
determining a plurality of purchase history search results by determining a plurality of web pages that are indexed by the web index and related to the at least one search term, and using the plurality of items associated with the plurality of purchases in the purchase history to determine which of the plurality of web pages are related to at least one of the plurality of items, wherein each of the plurality of purchase history search result includes one of the plurality of web pages that is related to at least one of the plurality of items, and wherein the determining the plurality of purchase history search results includes using the at least one search term, the purchase history, and a location included in the calendar; and
providing the plurality of purchase history search results for display on a display device, wherein web pages in the purchase history search results that are related to more recently purchased items are provided a prioritized display position relative to web pages that are related to less recently purchased items.

9. The non-transitory machine-readable medium of claim 8, wherein more recent purchases in the plurality of purchases are provided more weight in the determining the plurality of purchase history search results relative to less recent purchases in the plurality of purchases.

10. The non-transitory machine-readable medium of claim 8, wherein the purchase history is accessed over the network from a plurality of different purchase history databases through a plurality of different devices.

11. The non-transitory machine-readable medium of claim 8, wherein the method further comprises:
providing a plurality of search term search results for display on the display device adjacent the plurality of purchase history search results, wherein the plurality of search term search results include the plurality of web pages that are indexed by the web index and related to the at least one search term.

12. The non-transitory machine-readable medium of claim 8, wherein the determining the plurality of purchase history search results further comprises:
determining a superset of search term search results, each associated with a web page indexed by the web index, using the at least one search term; and
determining the plurality of purchase history search results using the pluraslity of items, wherein the plurality of purchase history search results comprise a subset of the superset of search term search results that are each related to at least one of the plurality of items.

13. The non-transitory machine-readable medium of claim 8, wherein the method further comprises:
accessing a search database over the network;
determining a plurality of previous searches associated with the plurality of items;
determining the plurality of purchase history search results through the association of the plurality of items with the plurality of previous searches.

14. The non-transitory machine-readable medium of claim 8, wherein the
location included in the calendar is associated in the calendar with a time period that is subsequent to a current time period.

15. A secure payment instruction system, comprising:
means for receiving at least one search term from a user;
means for accessing a purchase history for the user, wherein the purchase history is associated with a plurality of items;
means for accessing a web index;
means for accessing a calendar of the user;
means for determining a plurality of purchase history search results by determining a plurality of web pages that are indexed by the web index and related to the at least one search term, and using the plurality of items associated with the purchase history to determine which of the plurality of web pages are related to the plurality of items, wherein each of the plurality of purchase history search results includes one of the plurality of web pages that is related to at least one of the plurality of items, and wherein the determining the plurality of purchase history search results includes using the at least one search term, the purchase history, and a location included in the calendar; and means for providing the plurality of purchase history search results for display, wherein web pages that are related to more recently purchased items are provided a prioritized display position relative to web pages that are related to less recently purchased items.

16. The system of claim 15, wherein more recent purchases in the plurality of purchases are provided more weight in the determining the plurality of purchase history search results relative to less recent purchases in the plurality of purchases.

17. The system of claim 15, wherein the purchase history is accessed over a network from a plurality of different purchase history databases through a plurality of different devices.

18. The system of claim 15, further comprising:
means for providing a plurality of search term search results for display on the display device adjacent the plurality of purchase history search results, wherein the plurality of search term search results include the plurality of web pages that are indexed by the web index and related to the at least one search term.

19. The system of claim 15, wherein determining the plurality of purchase history search results further comprises:
means for determining a superset of search term search results, each associated with a web page indexed by the web index, using the at least one search term; and
means for determining the plurality of purchase history search results using the plurality of items, wherein the plurality of purchase history search results comprise a subset of the superset of search term search results that are each related to the plurality of items.

20. The system of claim 15,
wherein the location included in the calendar is associated in the calendar with a time period that is prior to a current time period.

\* \* \* \* \*